United States Patent
Hughes

(10) Patent No.: US 6,992,656 B2
(45) Date of Patent: Jan. 31, 2006

(54) COMPUTER MOUSE WITH DATA RETRIEVAL AND INPUT FUNCTIONALITIES

(76) Inventor: Micheal L. Hughes, 17076-4 Boca Club Blvd., Boca Raton, FL (US) 33487

( * ) Notice: Subject to any disclaimer, the term of this patent is extended or adjusted under 35 U.S.C. 154(b) by 98 days.

(21) Appl. No.: 10/604,718

(22) Filed: Aug. 13, 2003

(65) Prior Publication Data

US 2005/0035945 A1 Feb. 17, 2005

(51) Int. Cl.
*G09G 5/08* (2006.01)
(52) U.S. Cl. .................... 345/163; 715/780
(58) Field of Classification Search ............. 345/163, 345/168, 169, 156, 157, 172; 341/22, 23; 400/486, 489; 715/780
See application file for complete search history.

(56) References Cited

U.S. PATENT DOCUMENTS

| | | | | |
|---|---|---|---|---|
| 4,917,516 | A * | 4/1990 | Retter | 400/489 |
| 4,994,795 | A * | 2/1991 | MacKenzie | 345/163 |
| 5,063,376 | A * | 11/1991 | Chang | 345/163 |
| 5,181,029 | A * | 1/1993 | Kim | 341/20 |
| 5,408,601 | A * | 4/1995 | Nakamura et al. | 715/808 |
| 5,414,422 | A | 5/1995 | Allen | |
| 5,563,630 | A * | 10/1996 | Tsakiris et al. | 345/160 |
| 5,585,823 | A * | 12/1996 | Duchon et al. | 345/163 |
| 5,600,313 | A * | 2/1997 | Freedman | 341/22 |
| 5,825,362 | A * | 10/1998 | Retter | 345/168 |
| 5,854,624 | A * | 12/1998 | Grant | 345/169 |
| 5,875,311 | A | 2/1999 | Bertram | |
| 6,000,033 | A * | 12/1999 | Kelley et al. | 713/201 |
| 6,107,997 | A | 8/2000 | Ure | |
| 6,166,721 | A | 12/2000 | Kuroiwa | |
| 6,198,473 | B1 | 3/2001 | Armstrong | |
| 6,208,339 | B1 * | 3/2001 | Atlas et al. | 715/780 |
| 6,212,439 | B1 | 4/2001 | Cha | |
| 6,370,282 | B1 | 4/2002 | Pavley | |
| 6,445,378 | B1 | 9/2002 | Flagg | |
| 6,507,338 | B1 | 1/2003 | Liao | |
| 6,712,534 | B2 * | 3/2004 | Patel | 400/486 |
| 6,727,830 | B2 * | 4/2004 | Lui et al. | 341/20 |
| 2001/0005199 | A1 * | 6/2001 | Anderson | 345/168 |
| 2002/0008717 | A1 | 1/2002 | Sakaguchi | |
| 2002/0084986 | A1 | 7/2002 | Armstrong | |
| 2002/0167470 | A1 | 11/2002 | Chung | |
| 2003/0035011 | A1 * | 2/2003 | Lee et al. | 715/780 |
| 2003/0137491 | A1 | 7/2003 | Kuo | |
| 2003/0145283 | A1 | 7/2003 | Machida | |
| 2003/0210232 | A1 * | 11/2003 | Chen | 345/168 |

\* cited by examiner

*Primary Examiner*—Regina Liang
(74) *Attorney, Agent, or Firm*—Michael Ries & Associates; Michael Ries

(57) ABSTRACT

The current invention is a desktop operated computer control mouse including a housing, electronic circuitry within the housing, a user manipulable rotatable ball, optical technology, or other means for pointing control, and a plurality of front mounted buttons that are in addition to the standard depressible buttons known in the prior art of a computer control mouse, which are exposed on the housing and are electronically connected with circuitry. At least some or all of the additional finger depressible buttons are for user selection of signals to be sent to the computer for the purpose of initiating functioning macros, inputting specified user data, or launching user pre-selected commands, and are associated with electronic switches that allow for at least three input stages; depressing and holding, pressing once, and pressing twice.

53 Claims, 14 Drawing Sheets

FIG. 6

| 1. PERSONAL | 2. USERNAMES | 3. CREDIT CARD | 4. CUSTOM | PREFERENCES |

ADMINISTRATOR PREFERENCES

_DISABLE OPTIONS:_

[ ] DISABLE LOGIN ( SINGLE USER ONLY )

[ ] DISABLE MACROS AFTER [ ] OF NON-ACTIVITY

[SAVE]
[LOG OFF]

_USER OPTIONS:_

CHANGE USERNAME
OLD USERNAME [ ]
NEW USERNAME [ ]
RETYPE USERNAME [ ]

CHANGE PASSWORD
OLD PASSWORD [ ]
NEW PASSWORD [ ]
RETYPE PASSWORD [ ]

DELETE USERNAME [ ▼ ] [DELETE]

[EDIT CUSTOM TEMPLATE]

- Hold down Scroll Button for 3 seconds to launch MacroMouse Software
- Hold down any two Macro buttons together for 3 seconds to disable Macros (Log off)
- When Macros are disabled, Login Screen will launch when you press any Macro button
- Verification popup screen will briefly appear when changing Templates or Disabling Macros
- Icon in tray on desktop for fast launch
- Saved user info is encrypted and hidden as an added security feature

FIG. 10

Desktop Confirmation Pop-ups (2 seconds)

*MacroMouse*™

YOUR PERSONAL MACROS HAVE BEEN LOADED...

*MacroMouse*™

YOUR USERNAME MACROS HAVE BEEN

*MacroMouse*™

YOUR CREDIT CARD MACROS HAVE BEEN LOADED...

*MacroMouse*™

YOUR CUSTOM MACROS HAVE BEEN LOADED...

*MacroMouse*™

MACROS DISABLED...YOU ARE NOW LOGGED OFF

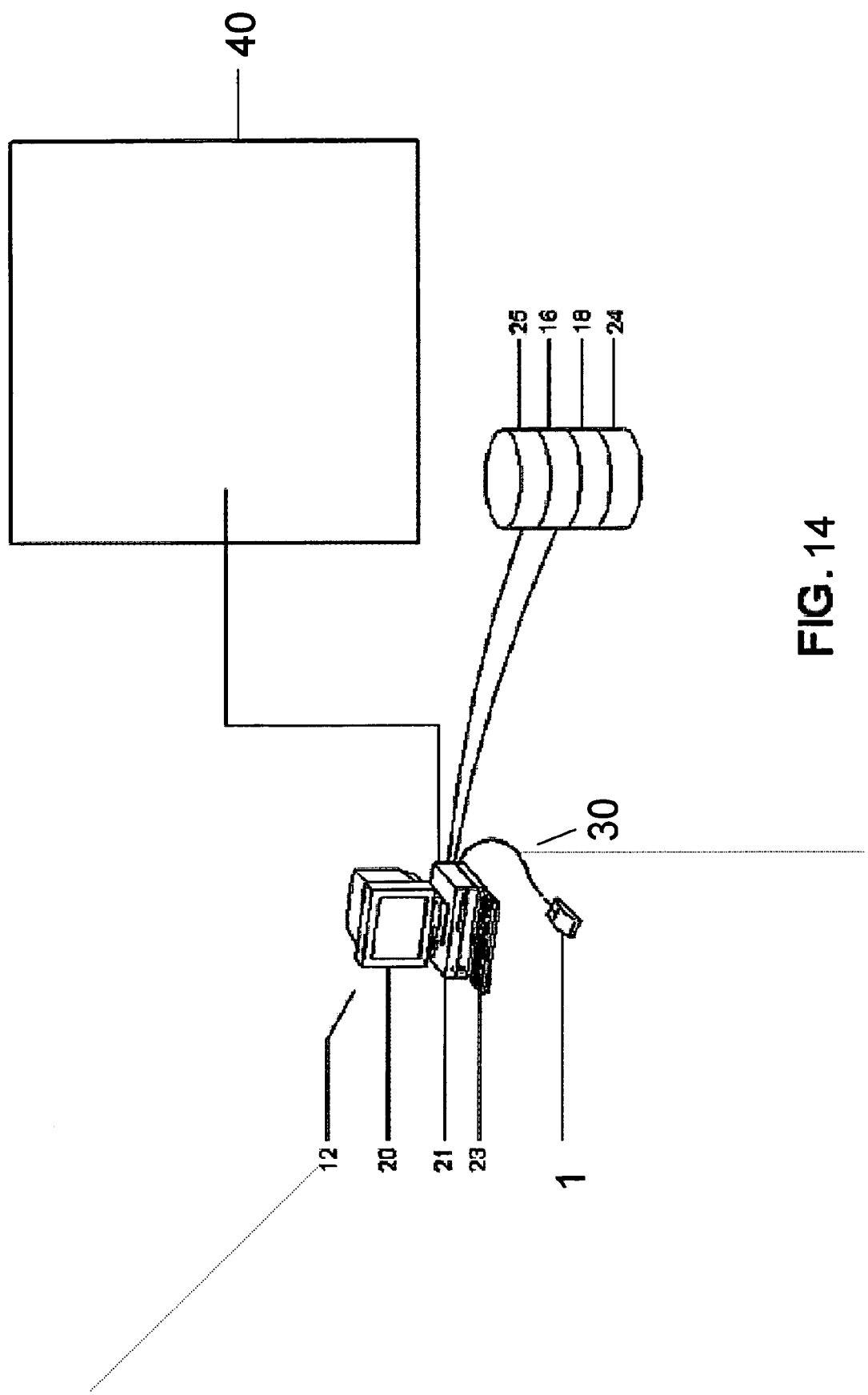

COMPUTER MOUSE WITH DATA RETRIEVAL AND INPUT FUNCTIONALITIES

BACKGROUND OF INVENTION

1. Field of the Invention

The present invention relates generally to a computer peripheral device and more specifically it relates to a computer mouse.

2. Description of Prior Art

There are a variety of known computer input devices. At one time, the most popular and commonly used computer input device was the keyboard.

The recent development and increased use of graphical user interface products, however, have served to highlight the inherent limitations of the conventional computer keyboard as an input device. For example, the conventional keyboard is designed primarily for textual input and allows limited control of cursor movements and data input flexibility. Unfortunately, data input and cursor control of such a limited nature often fails to take full advantage of the wide range of graphical functions provided in current graphical user interface products and thus frustrates the efficient and effective use of such products.

The functional and operational limitations of a conventional keyboard as a computer input device led to the development of alternative, more graphically oriented and user friendly computer input devices such as the joystick, mouse and trackball. Such alternative input devices require less direct attention (for example, eye contact) thus allowing the user to concentrate on the computer screen and the task at hand. These devices are specially designed to facilitate precision cursor movements, at varying speeds, and in virtually any desired direction, thus allowing the user to easily take full advantage of the enhanced graphical functions provided in current graphical user interface products.

However, common graphically oriented computer input devices typically retain an important limitation which is not present in the conventional computer keyboard: the inability to efficiently, and effectively, input the wide selection of user selected data that is many times requested and used in a repetitious manner in the data input fields of many graphical user interface products without depending on a secondary data input device, such as the conventional keyboard. For example, most current mouse devices are not large enough to have defined keys used for typing said data; and if did, would make the mouse device too large and impractical.

One disadvantage to this limitation is that the operator has to move his fingers from the computer mouse to the keyboard in order to complete the data input fields of many graphical user interface products, which is inefficient, time consuming, and can break the user's flow and concentration if done on a repetitive basis.

Another disadvantage is that using two computer input devices simultaneously requires more direct attention (for example, eye contact) which distracts the user from concentrating on the computer screen and the task at hand. This can be aggravating when dealing with repetitive data such as personal data, credit card information and usernames.

Kensington has a product called the "Expert Mouse Pro Trackball" that has a text store & paste feature, but it is for one field of general text only and is not specified data. It also does not allow for a quick and efficient method of pasting multiple different fields of specified user data that are often requested by many graphical user interface products today. It also does not allow for data to be stored for multiple users simultaneously. This limits its usefulness.

In these respects, a computer mouse that specifically addresses the use of front mounted buttons for initiating functioning macros, inputting specified user data, or launching user pre-selected commands substantially departs itself from the conventional concepts and designs of the prior art, and in so doing provides an apparatus developed for the purpose of effectively and efficiently inputting user selected data that is many times requested and used in a repetitious manner in the data input fields of many graphical user interface products without depending on a secondary data input device, such as the conventional keyboard.

There is still need for improvement in the art.

SUMMARY OF INVENTION

In view of the foregoing disadvantages inherent in the known types of computer mouse now present in the prior art, the present invention provides a new, improved computer mouse with front mounted buttons for the purpose of initiating functioning macros, inputting specified user data, or launching user pre-selected commands.

The current invention is a desktop operated computer control mouse including a housing, electronic circuitry within the housing, a user manipulable rotatable ball, optical technology, or other means for pointing control, and a plurality of front mounted buttons that are in addition to the standard depressible buttons known in the prior art of a computer control mouse, which are exposed on the housing and are electronically connected with circuitry. At least some or all of the additional finger depressible buttons are for user selection of signals to be sent to the computer for the purpose of initiating macros, inputting specified user data, or launching user pre-selected commands, and are associated with electronic switches that allow for at least three input stages; depressing and holding, pressing once, and pressing twice.

In accordance with the present invention, the disclosed mouse is formed in such a way as to include a plurality of front mounted buttons. The invention is a mouse having the standard features available on conventional mice known in the prior art, including main top mounted buttons, wheels, roller-balls, and the like. The frontal buttons are mounted in such a way as to provide for easy access by the operator. The function of the front buttons is to allow for the launching or activation of user commands, computer programs, or the inputting of specified user data or pre-set values (macros), such as name, email address, favorite password, etc, through the use of specialized software developed for this purpose.

A primary object of the present invention is to provide a computer mouse that will overcome the shortcomings of the prior art devices.

Another object is to provide a computer mouse with front mounted buttons for initiating functioning macros, inputting specified user data, or launching user pre-selected commands that do not interfere with the normal operation of a computer mouse.

Another object is to provide a computer mouse system with multi-user, data storage and retrieval capabilities.

Other objectives and advantages of the present invention will become obvious to the reader and it is intended that these objectives and advantages are within the scope of the present invention.

To accomplish the above and related objectives, this invention may be embodied in the form illustrated in the accompanying drawings, attention being called to the fact, however, that the drawings are illustrative only, and that changes may be made in the specific construction illustrated.

BRIEF DESCRIPTION OF DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 6 is a view of the user's personal information template screen of the software designed for the present mouse invention.

FIG. 10 is a view of the administrator's preferences of the software designed for the present mouse invention.

FIG. 11 displays the button summary screen.

FIG. 13 is a summary view of the defined keys.

FIG. 14 is a diagram displaying the mouse being used with a standard computer system.

DETAILED DESCRIPTION

Figure 1:
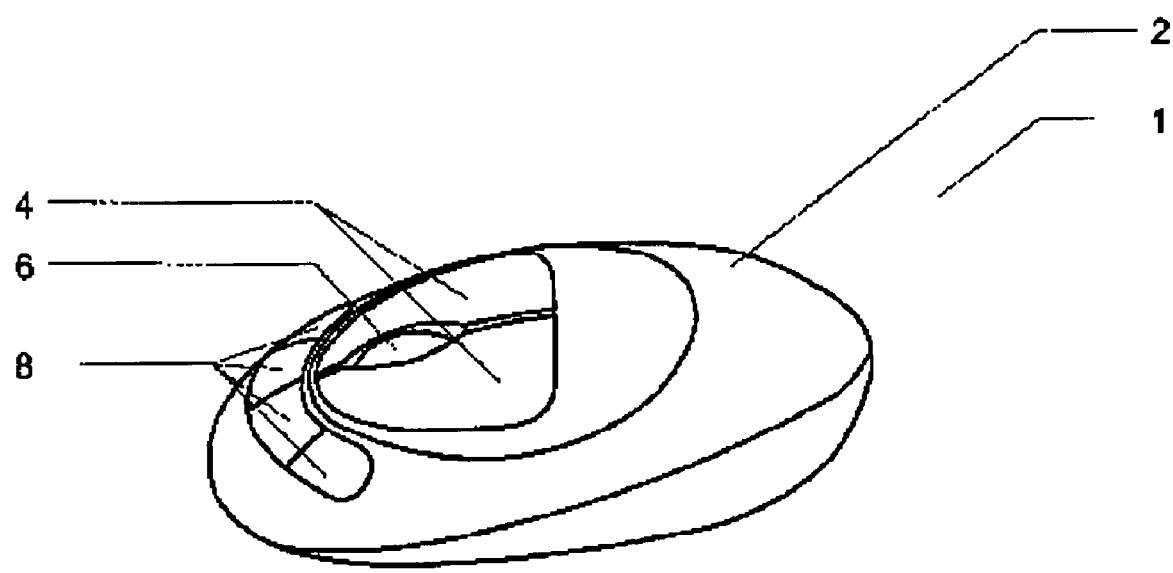
FIG. 1 is an angled view of the present mouse invention having a body 2 with main function buttons 4, a wheel 6 and additional front mounted buttons 8.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. In addition, the improved desktop mouse as taught herein can be shaped into different appearances including different buttons, different number of buttons, and different button locations. Also, it is to be understood that the phraseology and terminology employed herein are for the purpose of the description and should not be regarded as limiting.

Figure 2:
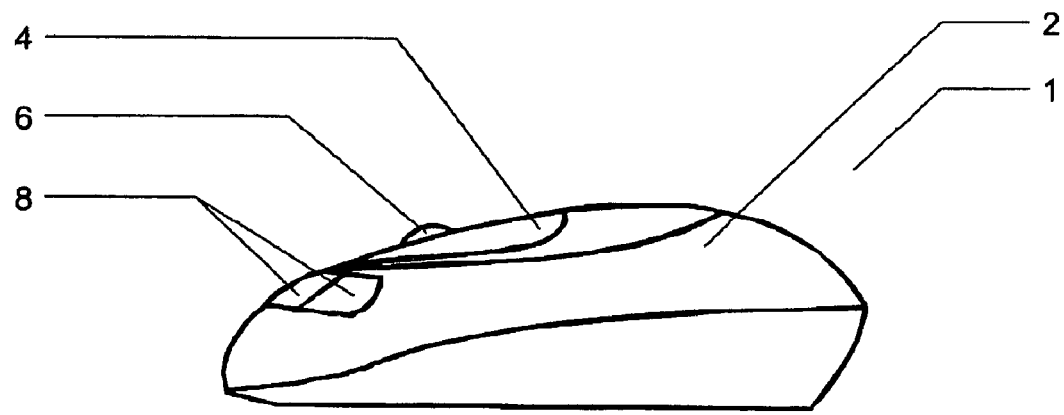
FIG. 2 is a side view of the present mouse invention having a body 2 with main function buttons 4, a wheel 6 and additional front mounted buttons 8.
Figure 3:
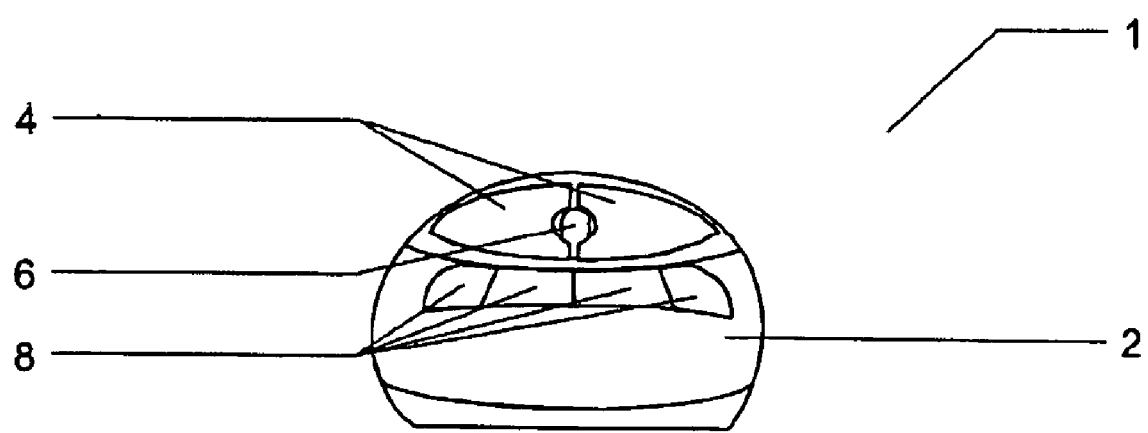
FIG. 3 is a front view of the present mouse invention having a body 2 with main function buttons 4, a wheel 6 and additional front mounted buttons 8.

The present invention, in one preferred form, as shown in FIGS. 1–3, is an improved computer control mouse 1 including a housing/body 2, electronic circuitry within the housing, a user manipulable rotatable ball, a wheel 6, optical technology, or other means for pointing control, and a plurality of front mounted buttons 8 that are in addition to the standard depressible buttons known in the prior art of a computer control mouse, which are exposed on the housing and are electronically connected with circuitry. The frontal buttons 8 are mounted in such a way as to provide for easy access by the operator. At least some or all of the frontal finger depressible buttons 8 are for user selection of signals to be sent to the computer 12 for the purpose of initiating functioning macros, inputting specified user data, or launching user pre-selected commands.

In one preferred form, the plurality of front mounted buttons (8) on the present improved mouse (1) are associated with electronic switches that allow for at least three input stages; depressing and holding, pressing once, and pressing twice.

The circuitry is structured to read an immediate, instant or current state or value of the electronic switches and to communicate representative control signals to the associated specialized computer software developed for this purpose.

In the preferred embodiment, the mouse would be ergonomically Designed for Left/Right hand users.

Operations

Figure 4:
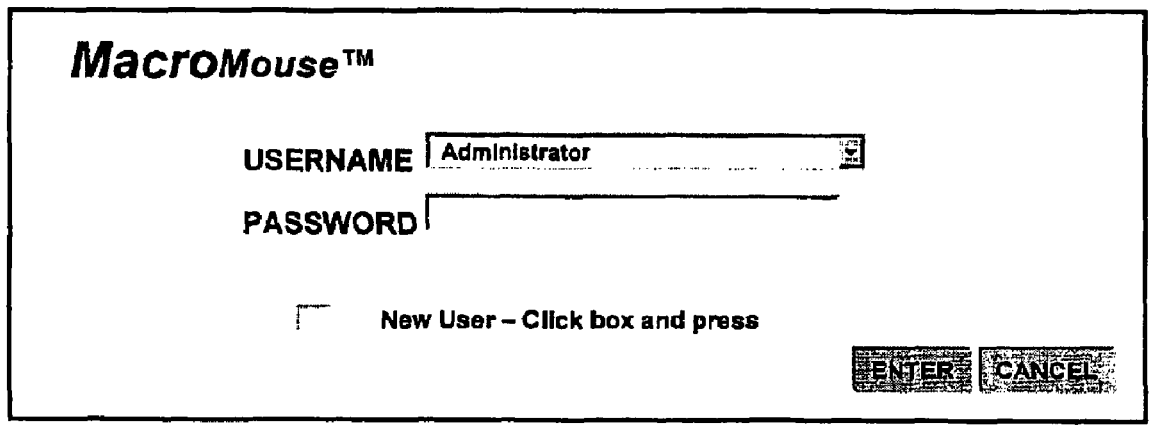
FIG. 4 is a view of the administrator sign-in screen of the software designed for the present mouse invention.

FIG. 4 shows a sample of the screen to confirm the user's username and password. There is a scroll bar for the user to select a username from usernames that have been entered. The user then goes to the next line and types in the password that the user selected. If the user can not remember the password, they simply click on the "I forgot my password" link. If the user is a new user without a username already, they would just check the box that says "New User," then press enter. In the preferred embodiment, the initial or main user would be named the "Administrator" and would be privileged to certain administrative features that all other users would not have access to, such as deleting a username and all data associated with that username, and turning on and off the username and password features.

Figure 5:
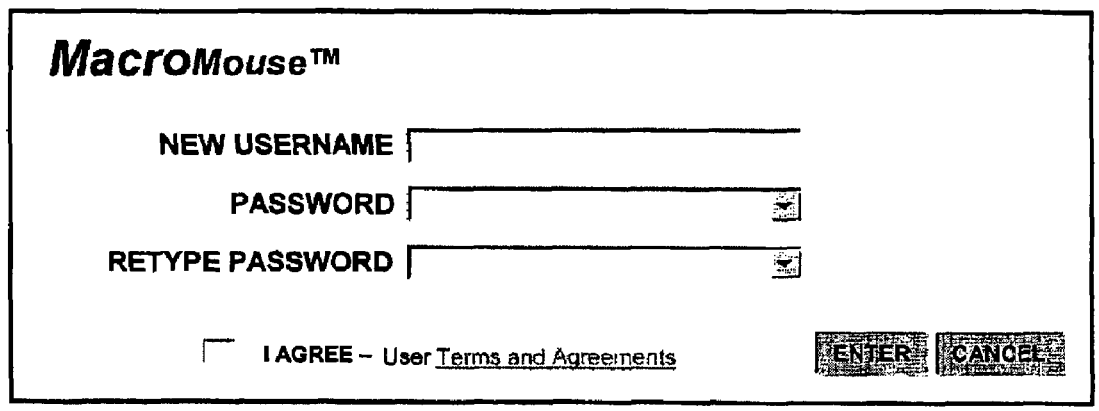
FIG. 5 is a view of the new user sign-in screen of the software designed for the present mouse invention.

FIG. 5 displays a New User screen In the first line the user types in the user's desired username. On the next line, they would type the password that the user wishes to use. The user then retypes the user's password on the next line to confirm that the user correctly typed it. Next, the user would have to agree to the "terms of service" to be able to use the mouse software 16 so the user would check that box then press the "ENTER" button on the screen.

Figure 6:
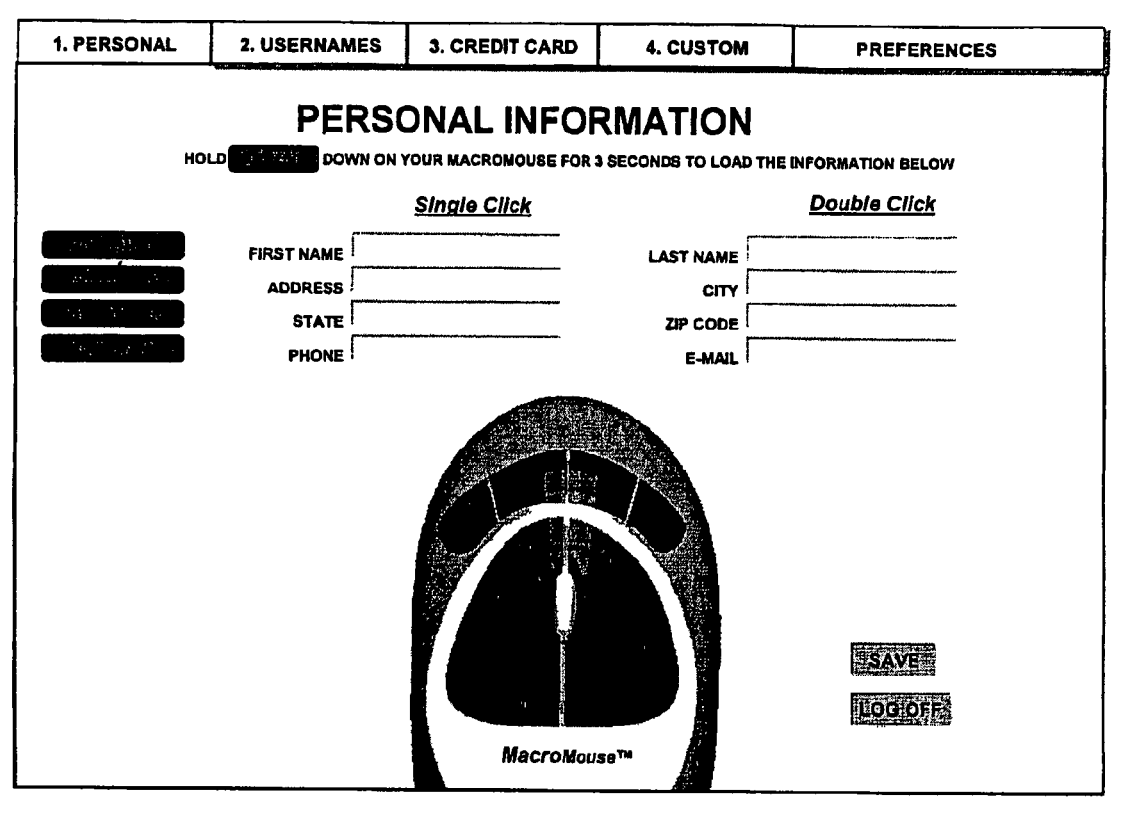

FIG. 6 displays the personal information template screen of the software where the user enters up to eight specific cells of the user's personal data (ie. Name, Address, City, Phone Number, etc.) which is then saved into a database (40) by the software (16). The user would fill in the information accordingly. The number of data cells presented in FIG. 6 should not be viewed as fixed or limiting.

After being saved, when the user intends to input this personal data into a document, website data entry form, or any means of a graphical user interface data request form containing a recipient text field, the user holds down frontal "BUTTON #1" on the computer mouse for three seconds to load the data from the personal data template into the computer's resident memory, which is then accessible by the mouse's four frontal buttons.

Once the data from the personal information template is loaded in the computer's resident memory, the eight cells of user personal data, as shown in FIG. 6, can be pasted or inserted into any document or file that responds to a cut and paste feature, or any of the desired recipient text fields of a website or any graphical user interface product by the user placing the curser in the desired recipient text field, and clicking or double clicking each of the four frontal buttons. For example, by pressing "BUTTON #1" once, it automatically inserts the user's first name. Press "BUTTON #1"

twice to automatically insert the user's last name. Then by pressing any of the other three buttons, either single or double click, the software (16) will input the corresponding information that was saved on the personal data template in the database (40).

Figure 7:
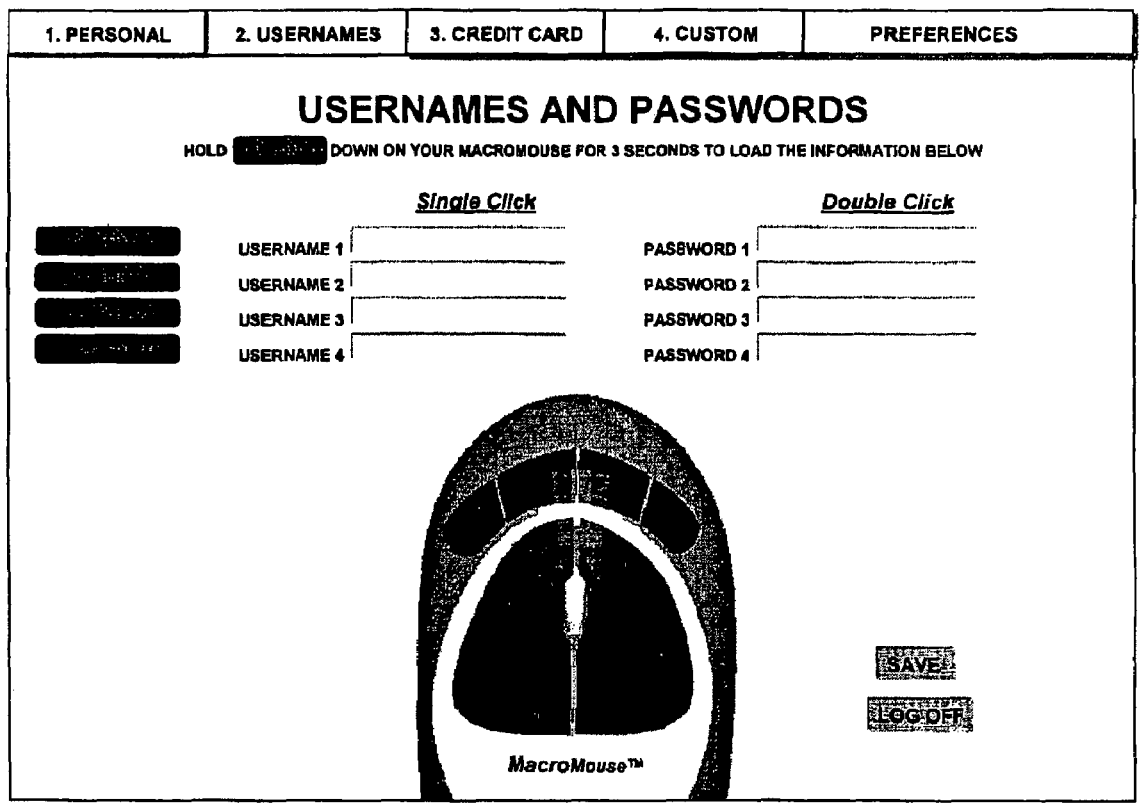
FIG. 7 is a view of the user's username template screen of the software designed for the present mouse invention.

FIG. 7 displays the username template screen of the software (16) where the user would enter up to four specific usernames and passwords, which is then saved into a database (40) by the software (16). The user would fill in the information accordingly. The number of data cells presented in FIG. 7 should not be viewed as fixed or limiting.

After being saved, when the user intends to input this username data into a document, website data entry form, or any means of a graphical user interface data request form containing a recipient text field, the user holds down frontal "BUTTON #2" on the computer mouse for three seconds to load the username data template into the computer's resident memory, which is then accessible by the mouse's four frontal buttons.

Once the data from the username template is loaded in the computer's resident memory, the eight cells of username and password data, as shown in FIG. 7, can be pasted or inserted into any document that responds to a cut and paste feature, or any of the desired recipient text fields of a website or any graphical user interface product by the user simply placing the curser in the desired recipient text field, and clicking or double clicking each of the four frontal buttons. For example, by pressing "BUTTON #1" once, it automatically inserts the user's first username. Press "BUTTON #1" twice to automatically insert the user's first password. Then by pressing any of the other three buttons, either single or double click, the software (16) will input the corresponding information that was saved on the username template in the database (40).

Figure 8:
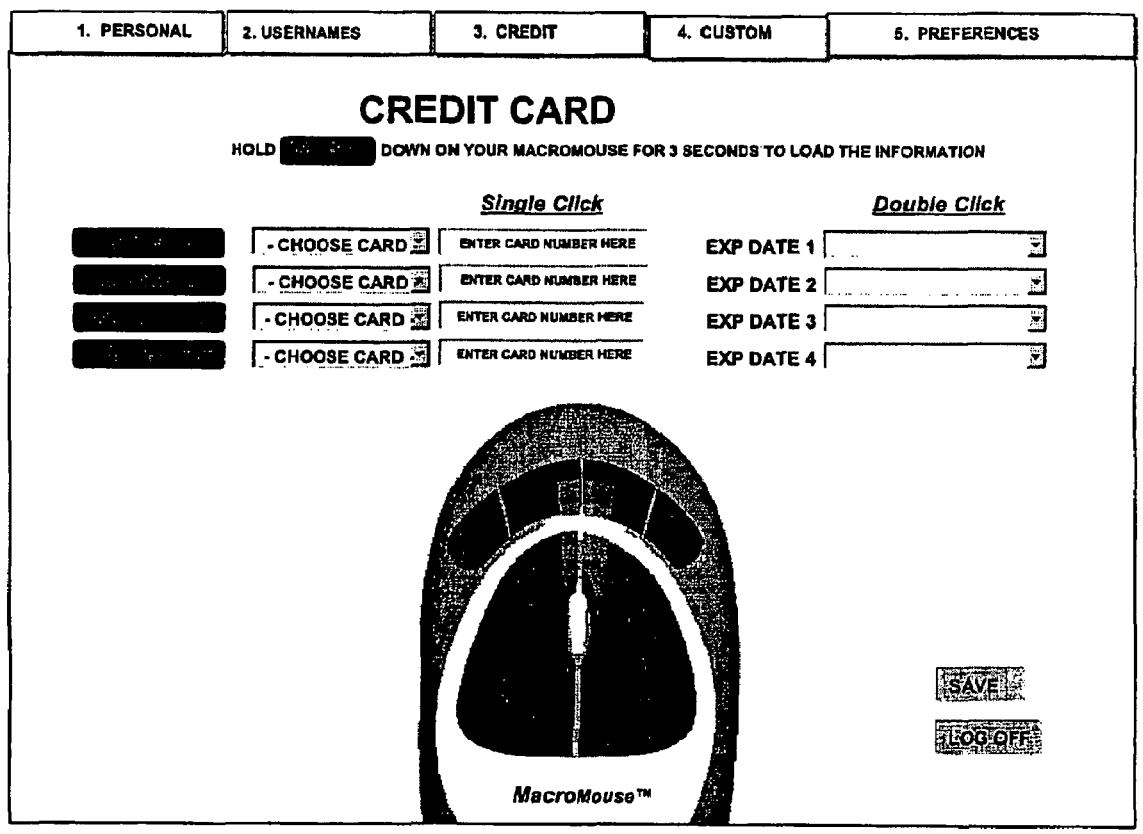
FIG. 8 is a view of the user's credit card template screen of the software designed for the present mouse invention.

FIG. 8 displays the credit card template screen of the software (16) where the user would select up to four types of cards (Visa, MasterCard, American Express, Discover, Debit Card, Etc.) and enter up to four specific credit card numbers and up to four specific expiration dates, which is then saved into a database (40) by the software (16). The user would fill in the information accordingly. The number of data cells presented in FIG. 8 should not be viewed as fixed or limiting.

After being saved, when the user intends to input this credit card data into a document, website data entry form, or any means of a graphical user interface data request form containing a recipient text field, the user holds down frontal "BUTTON #3" on the computer mouse for three seconds to load the credit card data template into the computer's resident memory, which is then accessible by the mouse's four frontal buttons.

Once the data from the credit card template is loaded in the computer's resident memory, the eight cells of credit card and expiration date data, as shown in FIG. 7, can be pasted or inserted into any document or file that responds to a cut and paste feature, or any of the desired recipient text fields of a website or any graphical user interface product by the user simply placing the curser in the desired recipient text field, and clicking or double clicking each of the four frontal buttons. For example, by pressing "BUTTON #1" once, it automatically inserts the user's first credit card number. By pressing "BUTTON #1" twice the expiration date of that card will be inserted. Then by pressing any of the other three buttons, either single or double click, the software (16) will input the corresponding information that was saved on the credit card template in the database (40).

Figure 9:
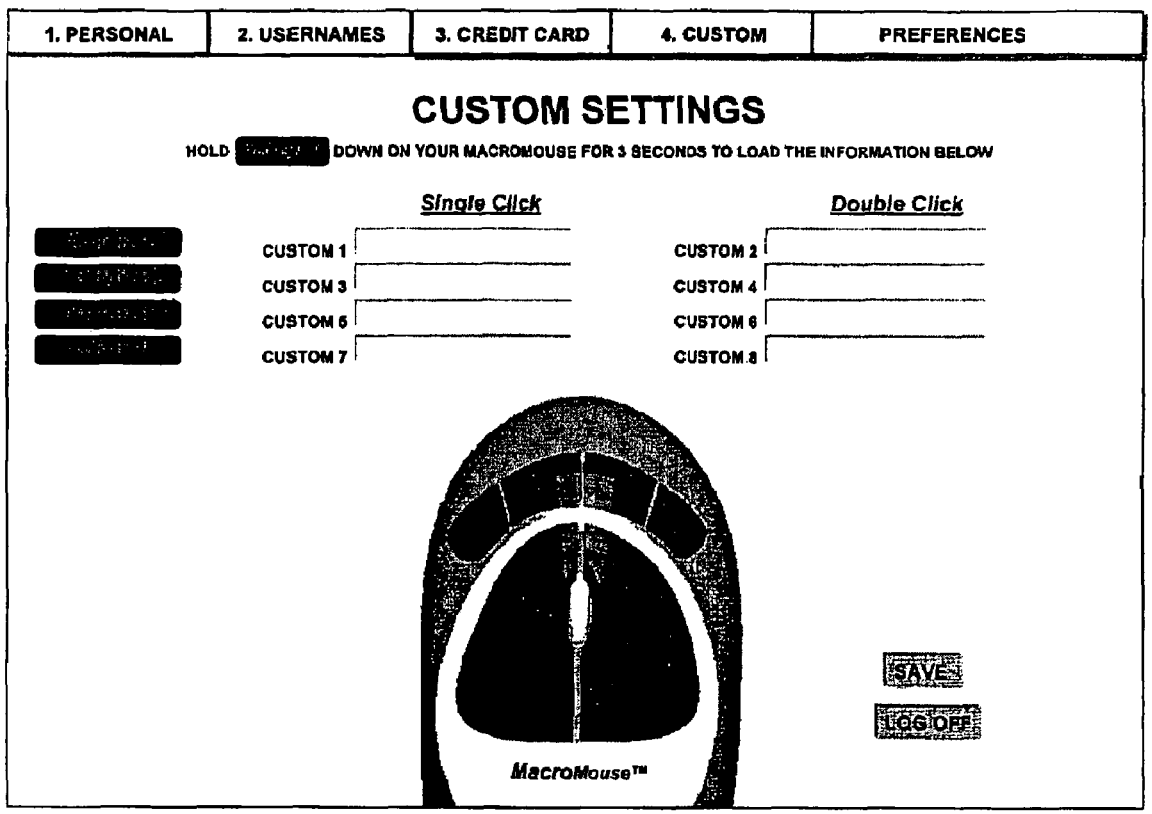
FIG. 9 is a view of the user's custom settings template screen with a drop down list of custom commands for the software designed for the present mouse invention.

FIG. 9 displays the custom settings template screen of the software (16) where the user would choose up to eight specific commands from a drop down menu, containing such commands as pasting custom text, opening a favorite website, open an internet browser, check email, compose a message, open a software program, launch instant messenger, print, open a file, paste a signature, etc., which is then saved into a database (40) by the software (16).

Each specific command will have a pop-up window which will allow the user to customize the appropriate settings of said commands (i.e. which file or software program to open) when chosen. The user would choose up to 8 command options accordingly. The number of command cells presented in FIG. 9 should not be viewed as fixed or limiting.

The software (16) in the preferred embodiment will allow the user to customize and add any command, combination of commands, and combination of commands and data insertion that the user would want. In the preferred embodiment, the drop down list commands can be customized and used multiple times with similar or different settings on each. For example, the user may want to customize all eight commands on the custom settings template to open eight different websites.

After being saved, when the user intends to initiate one of the said commands, the user simply holds down frontal "BUTTON #4" on the computer mouse for three seconds to load the custom settings template into the computer's resident memory, which is then accessible by the mouse's four frontal buttons.

Once the data from the custom settings template is loaded in the computer's resident memory, the eight cells of commands, as shown in FIG. 9, can be initiated by the user simply clicking or double clicking each of the four frontal buttons. For example, if the following commands were stored, pressing "BUTTON #1" once would automatically open the user's chosen internet browser. Pressing "BUTTON #1" twice would launch the user's chosen website. If any of the selected commands involve pasting or inputting information (such as general text, or signature) into a document or file that responds to a cut and paste feature, or a desired recipient text field of a website or any graphical user interface product, the user would first place the curser in the desired recipient text field, and then click or double click the appropriate frontal button. Then by pressing any of the other three buttons, either single or double click, the software (16) will activate the corresponding information or command that was saved on the custom settings template in the database (40).

FIG. 10 displays the Administrator Preferences template screen of the software. The screen would allow the user control over the options of the software (16). In the preferred embodiment of the software, the administrator has such options as disabling the login feature (appropriate for single users only), automatically disabling the macros after a chosen length of time of non-activity, changing the user's username and password, and completely deleting usernames. At the bottom of the screen there are directions for displaying the mouse software, launching the summary page, disabling the macros (log off), logging back in, and other features.

Figure 13:
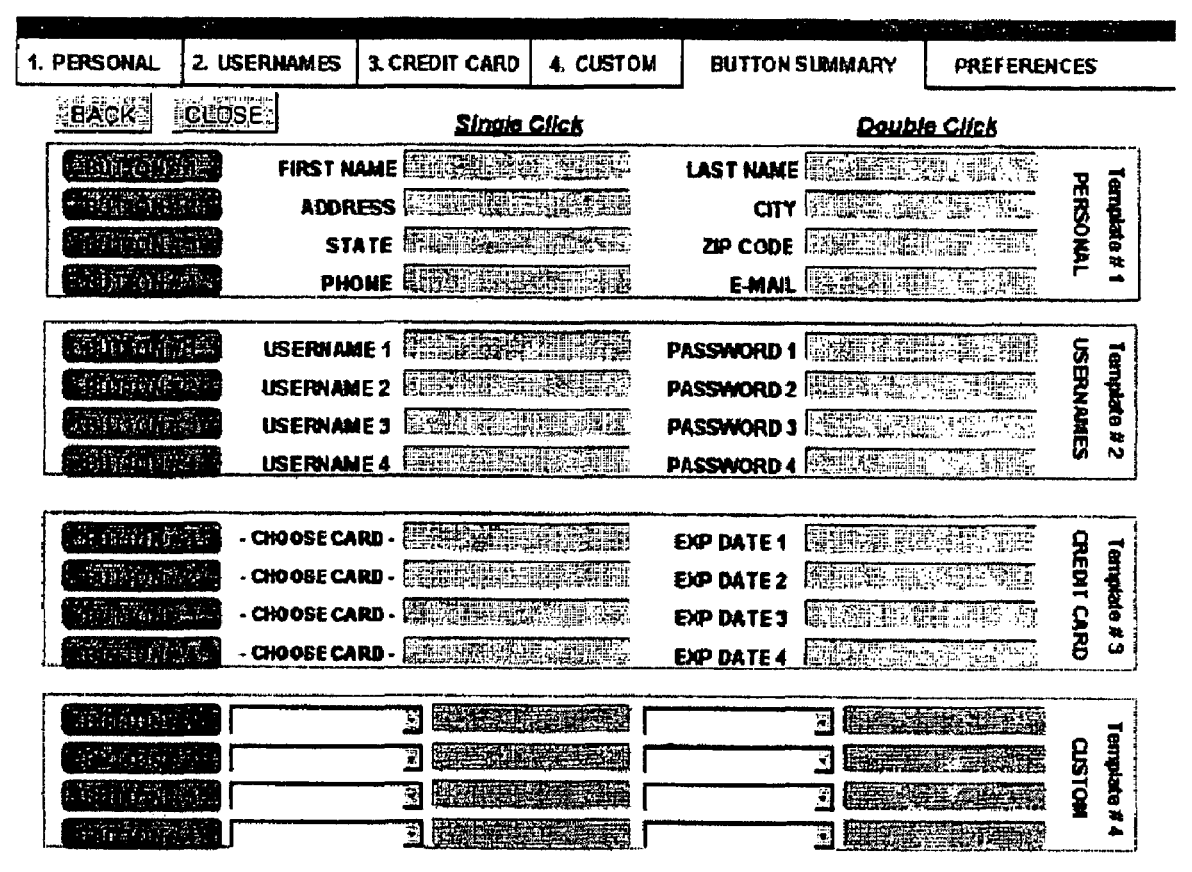

FIG. 13 displays the button summary screen of the software. It displays a list of the 8 specific values saved in the database (40) feor3 each of the 4 main templates (Personal Information, Usernames, Credit Card, Custom Settings). This screen gives the user a quick reference view of all of the templates' saved values for their particular username. The summary screen will give the user the summary of all the buttons and what the user has designated each to do.

Figure 12:
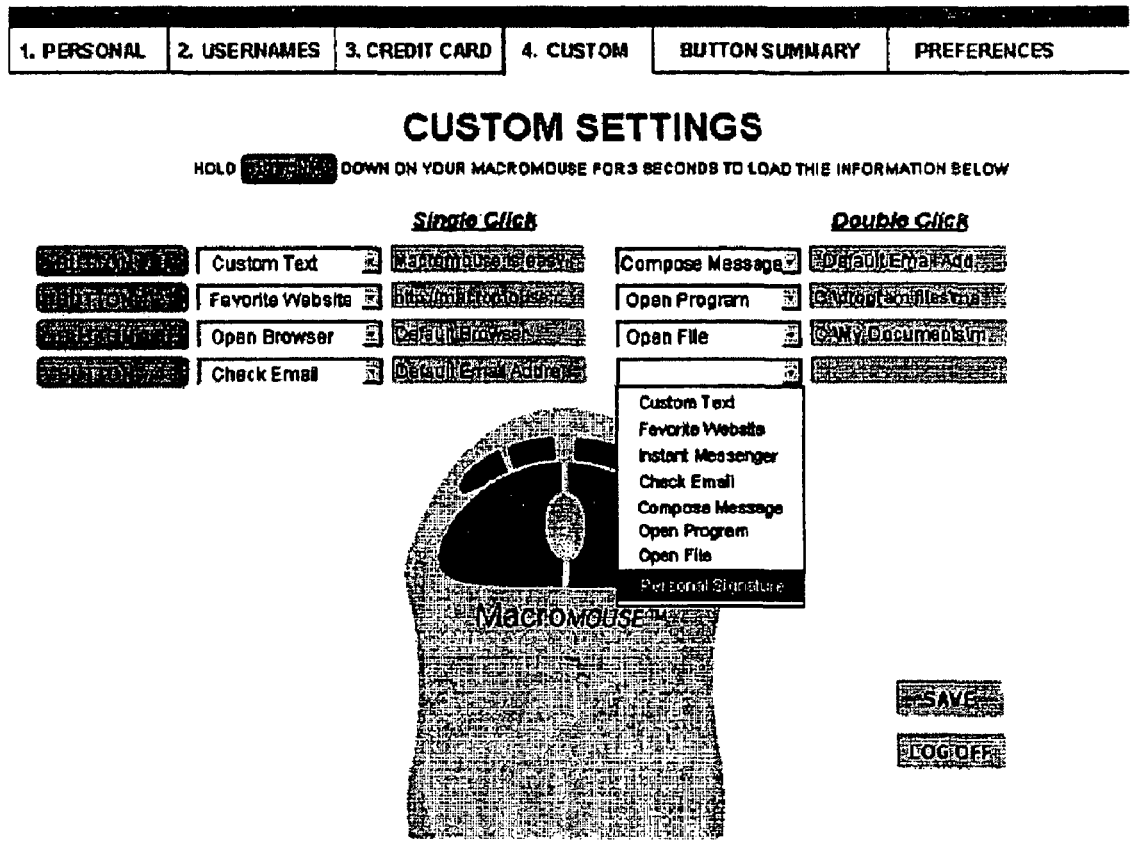
FIG. 12 is a view of the desktop confirmation pop-ups that are activated when user changes templates or disables macros of the software designed for the present mouse invention.

FIG. 12 displays a sample of desktop confirmation pop-ups of the software template. In the preferred embodiment, these confirmation pop-ups would appear briefly (approximately for 2 seconds) then automatically close whenever the user changes the template loaded in the computer's resident memory by pressing the chosen frontal buttons on the computer mouse for 3 seconds, or when the user removes a template loaded into the computer's resident memory by pressing any two of the frontal buttons at the same time for 3 seconds.

FIG. 14 displays a multi-conductor cable (30) having a cord end which plugs into a port on a computer (12) is common with conventional desktop mice. In one preferred form, a cable (30) would not be present on the present improved mouse, which communicates with a computer through wireless communication such as infrared light for example only, and which contains a battery to provide electrical power to the circuitry of mouse's circuit board.

FIG. 14 is a diagram illustrating a representative computer system 12 that is used with the current invention. The computer system 12 may include a display device 20, a chassis 21, and one or more user input devices, of which one of these is the mouse 1 and a keyboard 23. The mouse 1 is connected to the computer system by a cable 30. The chassis 21 may house a permanent storage system 24, such as a hard disk drive, optical disk drive, tape drive, or the like, which may store one or more software applications such as a web browser application 25, and the mouse software 16. The client computer system 12 may have a memory 26 resident therein and the software application(s) from the disk 24 may be transferred to the memory 26 to be executed by a CPU 18 in the computer system 12. The browser application 25 may be configured to connect the client computer system 12 with other machines 12 in the network 14 and receive graphical information (i.e., web pages) that may be displayed on the display device 20 to a user. The browser application 25 may also permit the client computer systems 12 to interact with the other machines 12. The mouse system 16 will have one or several databases 40 that will be stored in the permanent storage system 24.

The database (40) will be encrypted in the preferred embodiment. The software (16) will be written using programming techniques and knowledge that is commonly known in the art. This data encryption is for consumer and system protection.

The current invention allows for multiple simultaneous functions of each customizable button through the process of changing templates loaded in the computer's resident memory. The current invention allows for the process of switching templates loaded in the computer's resident memory through holding down any of the four frontal buttons for 3 seconds.

In the preferred embodiment, the software (16) is designed for multiple users with interchangeable data & password protection for each. Also in the preferred embodiment, is the user's ability to design and create customized templates.

Additional Embodiment

An additional embodiment of the current invention would be to have the database (40) of the mouse system stored either on a permanent storage system accessible to other computers on a network, or stored on the network itself, and would be accessible to all computer mice connected to the network via usernames and passwords or other security related features. This would allow a user access to their customized data anywhere on the network no matter which mouse they were using. Another feature that the said mouse system would have is the capability to close "pop-up" windows (i.e. advertisements) that appear on the graphical user interface display when accessing certain websites. The user will simply press down or "click" the scroll button, or any other button on the said mouse (1) the user chooses to apply this feature to, which will activate the window closing feature, therefore closing the pop-up window.

Advantages The previously described version of the present invention has many advantages. The mouse that specifically addresses the use of front mounted buttons for initiating functioning macros, inputting specified user data, or launching user pre-selected commands substantially departs itself from the conventional concepts and designs of the prior art, and in so doing provides an apparatus developed for the purpose of effectively and efficiently inputting user selected data that is many times requested and used in a repetitious manner in the data input fields of many graphical user interface products without depending on a secondary data input device, such as the conventional keyboard.

Although the present invention has been described in considerable detail with reference to certain preferred versions thereof, other versions are possible. Therefore, the point and scope of the appended claims should not be limited to the description of the preferred versions contained herein.

The process of using the mouse system to input data from a database to a document, website data entry form, or any means of a graphical user interface data request form containing a recipient text field through first loading the data into a computer's resident memory, is also presented for the purpose of the description and should not be viewed as fixed or limiting.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the said invention.

That which is claimed is:

1. An apparatus comprising:
  a computer mouse having a plurality of buttons a single click selects a first queue and a double click selects a second queue that appear on a display, the first queue has a first plurality of data fields assigned to the plurality of buttons and the second queue has a second plurality of data fields assigned to the plurality of buttons, both first plurality of data fields and second plurality of data fields are selected by a pointer on the display that is positioned by moving the computer mouse.

2. The device of claim 1 wherein the plurality of buttons are on a front edge of the computer mouse and are assigned names button 1, button 2, button 3 and button 4.

3. The device of claim 1 wherein the plurality of templates have four data fields for each single click and double click.

4. The device of claim 1 wherein the plurality of templates have four data fields for each single click and double click, the four data fields having a drop down menu to select predetermined data that is added to the data fields.

5. The device of claim 1 wherein the plurality of templates have four data fields for each single click and double click, the four data fields having a drop down menu to manually enter user data in the data fields.

6. The apparatus of claim 1 wherein all data fields are filled with information supplied from an operating system.

7. The apparatus of claim 6 wherein the operating system supplies the information from an operating system sign-in screen.

8. The apparatus of claim 1 wherein the functional manner activates commends through specified software programs.

9. The apparatus of claim 1, wherein all data fields are for credit card information.

10. The apparatus of claim 1, wherein all data fields are for usernames and passwords.

11. The apparatus of claim 1, wherein all data fields are for personal information.

12. The apparatus of claim 1, wherein all data fields are user defined.

13. The apparatus of claim 1, wherein all data fields are for a plurality of users each user has information that is saved in a database.

14. The apparatus of claim 1, wherein one of the data fields is for a first name.

15. The apparatus of claim 1, wherein one of the data fields is for a last name.

16. The apparatus of claim 1, wherein one of the data fields is for an address.

17. The apparatus of claim 1, wherein one of the data fields is for a city.

18. The apparatus of claim 1, wherein one of the data fields is for a state.

19. The apparatus of claim 1, wherein one of the data fields is for a zip code.

20. The apparatus of claim 1, wherein one of the data fields is for an email address.

21. The apparatus of claim 1, wherein one of the data fields is for a phone number.

22. The apparatus of claim 1, wherein all the data fields are encrypted.

23. The apparatus of claim 1, wherein software programs save data in a database for a plurality of users that is accessible by a plurality of users through a LAN, WAN or Internet connection.

24. The apparatus of claim 1, wherein software programs save data in a database that is accessible through the use of usernames and passwords.

25. An apparatus comprising:
   a computer mouse having a plurality of buttons a single click on any of the buttons selects a first queue and a double click on any of the buttons selects a second queue in a plurality of templates that appear on a display, the first queue having first plurality of data fields assigned to the plurality of buttons and the second queue having a second plurality of data fields assigned to the plurality of buttons, both first plurality of data fields and second plurality of data fields are selected by a pointer on the display that is positioned by moving the computer mouse.

26. The device of claim 25 wherein the plurality of buttons are on a front edge of the computer mouse and are assigned names button 1, button 2, button 3 and button 4.

27. The device of claim 25 wherein the plurality of templates have four data fields for each single click and double click.

28. The device of claim 25 wherein the plurality of templates have four data fields for each single click and double click, the four data fields having a drop down menu to select predetermined data that is added to the data fields.

29. The device of claim 25 wherein the plurality of templates have four data fields for each single click and double click, the four data fields having a drop down menu to manually enter user data in the data fields.

30. The apparatus of claim 25 wherein all data fields are filled with information supplied from an operating system.

31. The apparatus of claim 30 wherein the operating system supplies the information from an operating system sign-in screen.

32. The apparatus of claim 25 wherein the functional manner activates commends through specified software programs.

33. The apparatus of claim 25 wherein all data fields are for credit card information.

34. The apparatus of claim 25 wherein all data fields are for usernames and passwords.

35. The apparatus of claim 25 wherein all data fields are for personal information.

36. The apparatus of claim 25 wherein all data fields are user defined.

37. The apparatus of claim 25 wherein all data fields are for a plurality of users each user has information that is saved in a database.

38. The apparatus of claim 25 wherein one of the data fields is for a first name.

39. The apparatus of claim 25 wherein one of the data fields is for a last name.

40. The apparatus of claim 25 wherein one of the data fields is for an address.

41. The apparatus of claim 25 wherein one of the data fields is for a city.

42. The apparatus of claim 25 wherein one of the data fields is for a state.

43. The apparatus of claim 25 wherein one of the data fields is for a zip code.

44. The apparatus of claim 25 wherein one of the data fields is for an email address.

45. The apparatus of claim 25 wherein one of the data fields is for a phone number.

46. The apparatus of claim 25 wherein all the data fields are encrypted.

47. The apparatus of claim 25 wherein software programs save data in a database for a plurality of users that is accessible by a plurality of users through a LAN, WAN or Internet connection.

48. The apparatus of claim 25 wherein software programs save data in a database that is accessible through the use of usernames and passwords.

49. A method comprising:
   activating a plurality of buttons on a computer mouse;
   selecting a first queue with a single click on any of the buttons;
   selecting a second queue with a double click on any of the buttons;

assigning a first plurality of data fields of the first queue to the plurality of buttons and a plurality of templates that appear on a display, the first plurality of data fields selected by a pointer on the display that is positioned to the first plurality of data fields by moving the computer mouse; and assigning a second plurality of data fields of the second queue to the plurality of buttons and the plurality of templates that appear on the display, the second plurality of data fields selected by a pointer on the display that is positioned to the second plurality of data fields by moving the computer mouse.

50. The device of claim 49 wherein the plurality of buttons are on a front edge of the computer mouse and are assigned names button 1, button 2, button 3 and button 4.

51. The device of claim 49 wherein the plurality of templates have four data fields for each single click and double click.

52. The device of claim 49 wherein the plurality of templates have four data fields for each single click and double click, the four data fields having a drop down menu to select predetermined data that is added to the data fields.

53. The device of claim 49 wherein the plurality of templates have four data fields for each single click and double click, the four data fields having a drop down menu to manually enter user data in the data fields.

* * * * *